United States Patent Office 3,551,418
Patented Dec. 29, 1970

3,551,418
TETRA TERTIARY AMINO METHANES AND THEIR PREPARATION
Harold I. Weingarten, St. Louis, and William A. White, Creve Coeur, Mo., assignors to Monsanto Company, St. Louis, Mo., a corporation of Delaware
No Drawing. Filed Apr. 18, 1966, Ser. No. 543,080
Int. Cl. C07d 87/40
U.S. Cl. 260—246                        8 Claims

ABSTRACT OF THE DISCLOSURE

The present invention relates to amine compounds and the preparation thereof, particularly the group of tetrakis-(disubstitutedamino)methane compounds. These compounds have utility as aminating agents in organic chemistry, and also in the manufacture of chelating agents. Other uses are as herbicides, insecticides, bacterocides, and as catalysts in urethane polymerizations.

---

The present invention relates to a new class of amine compounds, particularly the group of tetrakis(disubstitutedamino)methane compounds, and the process of preparing such compounds.

The series of completely substituted tetrakis (disubstitutedamino)methane compounds have long been desired, for example, as precursors of substituted guanidines, e.g., the compound

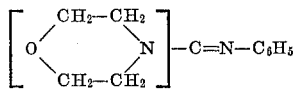

which is obtained from tetra morpholino methane by treatment with aniline. However, there have been no methods available for the production of tetrakis(disubstitutedamino)methane, and there is also considerable doubt, on the basis of stereochemistry, that the four substituted groups could be present on the methane core without encountering steric crowding to the extent of instability.

It has now been found that tetrakis(disubstitutedamino) methane compounds, C(NR$_2$)$_4$, may be prepared by beginning with a compound having the general formula:

$$(R_2N)_n\text{—}C\text{—}X_{(4-n)}$$

where $n$ is a whole number from 1 to 3; and R is selected from the group consisting of hydrocarbyl radicals of from 1 to 10 carbon atoms including aliphatic and alicyclic radicals, for example, the methyl, ethyl, propyl, butyl, pentyl, hexyl, heptyl, octyl, nonyl and decyl radicals, including both straight chain and branched saturated and unsaturated isomers; and aryl radicals of 6 to 20 carbon atoms including the phenyl, naphthyl, and anthracyl radicals; and also heterocyclic radicals having from 4 to 20 carbon atoms, the heterocyclic radicals, also having substituents of the group consisting of nitrogen and oxygen, for example, the morpholino, pyrrolidinyl and the piperidinyl radicals.

Mixed radicals may also be present and the heterocyclic radicals include bridge structures. In the general formula above, the ligand X attached to the carbon atom of the starting amine is a halide, for example, chloride, bromide and iodide radicals.

In the general formula above, when $n$ is 2 or 3, the starting compound preferably exists as a salt,

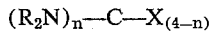

wherein the $\overset{\ominus}{X}$ anion, which is indicated with a negative charge, is selected from the group consisting of halides, for example, chloride, bromide and iodide, and sulfate, perchlorate, tetrafluoroborate, and p-toluene sulfonate. Accordingly, typical starting salts employed in the practice of the invention are tetramethylchloroformamidinium chloride, tetrapentyliodoformamidinium p-toluenesulfonate, and tetradecylbromoformamidinium tetrafluoroborate. Compounds of this type are prepared from the appropriate tetraalkylurea and phosgene in accordance with the typical reaction shown below.

The present reactant employed with the aforesaid material has the general formula MNR$_2$. In this formula M is selected from the group consisting of lithium, sodium, potassium, magnesium, calcium, titanium, and zirconium, a preferred group being lithium, sodium and potassium.

The general equation for the present process is $$(R_2N)_nCX_{(4-n)} + (4-n)M(NR_2) \rightarrow$$
$$(R_2N)_4C + (4-n)MX$$

wherein the symbols have the meaning set forth above. The process is adaptable to a variety of compounds such as are discussed below, specifically referring to 2,2-bis-(dimethylamino-1,3-dimethylimidazolidine. In general the proportions may be varied considerably, but it is preferred that approximately stoichiometric proportions be employed, so that in the above reaction the use of an approximately mole proportion of the left reactant is conducted with $(4-n)$ mole proportions of the right reactant. An example of a suitable product compound with a bridged structure is 2,2-bis(dimethylamino)-1,3-dimethylimidazolidine,

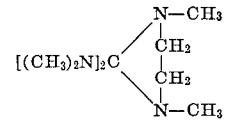

The exact mechanism of the present process has not been completely elucidated, but the mechanism shown below for a specific compound appears to be the most likely one. However, the present invention is not based upon any specific mechanism.

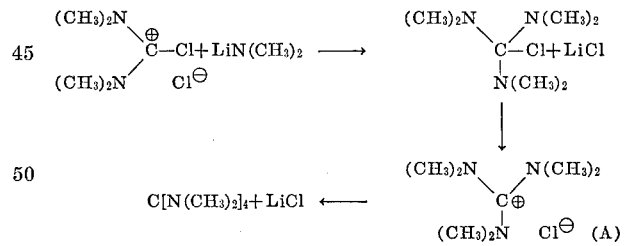

It is possible to carry out a similar transformation using as starting material compounds in which $n$ is 1 or 3 as well as $n$ is 2, in the general formula $[R_2N]_nCX_{(4-n)}$. When $n$ is 1, the $n=2$ and $n=3$ type compounds would be intermediates in the reaction. The tetramethylchloroformamidinium chloride shown as the starting material above can be prepared by known methods such as described by H. Eilingsfeld, G. Neubauer, M. Seefelder and H. Weidinger, Ber., 97, 1232 (1964), and the preparation of compounds of the mono-substituted type has been described by A. J. Crukshank, H. A. Bewick, J. E. Currah, and F. E. Beamish in Anal. Chem. 19, 249 (1947). The preparation of the tri-substituted ($n=3$) starting materials has been described by H. Lecher and F. Graf in Ann., 438, 154 (1924), and Ann., 445, 61 (1925).

The process for the preparation of the desired tetrakis-(dialkylamino)methane compounds is to mix together the two reactants set forth above in approximate stoichiometric proportions at a temperature of from —20° C. to 200° C., a preferred range being from 0° C. to 100° C. While a solvent is not necessary in carrying out this process, it is often desirable to employ a non-reactive solvent, for example, benzene, toluene, pentane, hexane, ethyl ether, or dioxane. The pressure imposed upon the reaction system is not a critical variable so that vacuum, atmospheric or super-atmospheric conditions may be employed.

The tetrakis(dialkylamino)methane compounds of the present invention have utility as aminating agents in organic chemistry, as is shown in the following example.

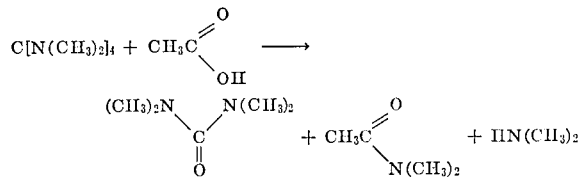

Another use for the compounds of the present invention is in the manufacture of chelating agents by the reaction with a metal, for example, magnesium, as shown in the following example in which the reacting metal is generally designated by the symbol M.

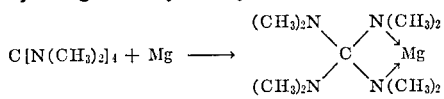

Other uses for the present compounds are as herbicides, insecticides and bacterocides, and, because of their strongly basic nature, as catalysts in urethane polymerizations.

Another use for the present compounds is as precursors of substituted guanidines, for example, as shown by the following equation:

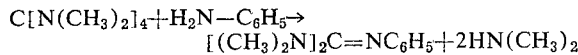

The following examples illustrate specific embodiments of the present invention:

EXAMPLE 1

The present example, as well as those which follow, is carried out in an atmosphere of dry nitrogen. The preparation of the tetrakis(dimethylamino)methane is shown in the present example. To a 1 liter, four-necked, round-bottom flask fitted with a stirrer, dropping funnel, condenser and thermometer is added 400 ml. of benzene, and the flask cooled to 5° C. with an ice bath. Eighty-five (85) ml. of butyl lithium solution, 12.3 g. (0.192 mole), is added, maintaining the temperature at about 5° C. A solution of 45 ml. dimethylamine 29 g. (0.64 mole) in 100 ml. benzene is added dropwise in 1 hr. keeping the reaction temperature below 20° C. The resulting slurry of N,N-dimethyl lithamide is allowed to warm to room temperature, and is stirred for 1 hour. Sixteen grams (0.094 mole) of tetramethylchloroformamidinium chloride is added. The slurry is dissipated quickly, and the solution is stirred 12 hours at room temperature. The solution is filtered and the precipitate washed with benzene. The solvent is distilled off using a slight vacuum. A yellowish white solid remains. This is distilled at 120° C. at 35 mm. to give 12.5 g. (71% yield) of tetrakis(dimethylamino)methane. After being recrystallized from n-pentane the resulting colorless crystals have a M.P. of 122.5° to 124.5°, and a single NMR peak at T 7.39 (benzene solvent, tetramethylsilane internal standard).

*Analysis.*—Calcd.: C, 57.45%; H, 12.76%; N, 29.79%; mol wt. 188. Found: C, 57.43%; H, 12.80%; N, 29.42%; mol wt. 189±3. (Cryoscopy in benzene.)

EXAMPLE 2

The present example shows the preparation of tetramorpholinomethane. To a 2.6 g. (0.01 mole) slurry of chlorodimorpholinocarbonium chloride in benzene is added a slurry of 1.86 g. (0.02 mole) of morpholino lithium prepared as in Example 1. The reaction mixture is allowed to stand 12 hours and is then filtered. The solvent is removed and the tetramorpholinomethane residue gradually crystallizes to a waxy solid.

EXAMPLE 3

The present example shows the preparation of tetrakis-(didecylamino)methane. To a 8.6 g. (0.01 mole) slurry of tetradecylbromoformamidinium-p-toluene sulfonate in benzene is added 6.1 g. (0.02 mole) of lithium didecylamide prepared as in Example 1. The mixture is refluxed under nitrogen atmosphere for 24 hours. The reaction mixture is then filtered and the solvent removed leaving the tetrakis(didecylamino)methane residue as a high boiling oil.

EXAMPLE 4

The present example shows the preparation of di(dimethylamino)di(pyrrolidinyl)methane. To a benzene slurry of tetramethylchloroformamidinium chloride (3.4 g. equivalent to 0.02 mole) is added a benzene slurry of pyrrolidinyl lithium 3.1 g. (0.04 mole) prepared as in Example 1. The mixture is allowed to stand 12 hours at room temperature, filtered and the solvent removed. The residue is distilled at reduced pressure yielding a colorless mobile liquid.

What is claimed is:

1. The compound tetrakis(dimethylamino)methane.
2. The compound tetramorpholinomethane.
3. The compound tetrakis(didecylamino)methane.
4. A compound di(dimethylamino)di(pyrrolidinyl)methane.
5. Process for the preparation of tetrakis(dimethylamino)methane, which comprises admixing together an approximately mole proportion, of tetramethylchloroformamidinium chloride, together with 2 mole proportions of dimethylamino lithium.
6. Process for the preparation of tetramorpholinomethane, which comprises admixing together an approximately mole proportion of chlorodimorpholinocarbonium chloride, together with 2 mole proportions of morpholinolithium.
7. Process for the preparation of tetrakis(didecylamino)methane, which comprises admixing together an approximately mole proportion, of tetradecylbromoformamidinium-p-toluene sulfonate, together with 2 mole proportions of lithium didecylamide.
8. Process for the preparation of di(dimethylamino)di(pyrrolidinyl)methane, which comprises admixing together an approximately mole proportion, of tetramethylchloroformamidinium chloride, together with 2 mole proportions of pyrrolidinyl lithium.

References Cited

UNITED STATES PATENTS 3,305,550   2/1967   Koenig et al. _____ 260—583

ALEX MAZEL, Primary Examiner

J. TOVAR, Assistant Examiner

U.S. Cl. X.R.

260—242, 293, 309.7, 326.85, 583

UNITED STATES PATENT OFFICE
CERTIFICATE OF CORRECTION

Patent No. 3,551,418     Dated December 29, 1970

Inventor(s) Harold I. Weingarten et al

It is certified that error appears in the above-identified patent and that said Letters Patent are hereby corrected as shown below:

Column 1, line 33, at the bottom of the bracket on the outside should be a -- $_2$ --.

Column 2, line 23, "(dimethylamino-1,3-" should be -- (dimethylamino)-1,3- --.

Signed and sealed this 14th day of September 1971.

(SEAL)
Attest:

EDWARD M.FLETCHER,JR.
Attesting Officer

ROBERT GOTTSCHALK
Acting Commissioner of Pater